(12) United States Patent
Ri et al.

(10) Patent No.: US 11,478,857 B2
(45) Date of Patent: Oct. 25, 2022

(54) CUTTING INSERT

(71) Applicant: KYOCERA CORPORATION, Kyoto (JP)

(72) Inventors: Kou Ri, Satsumasendai (JP); Kenji Kumai, Satsumasendai (JP)

(73) Assignee: KYOCERA Corporation, Kyoto (JP)

( * ) Notice: Subject to any disclaimer, the term of this patent is extended or adjusted under 35 U.S.C. 154(b) by 634 days.

(21) Appl. No.: 16/473,632

(22) PCT Filed: Dec. 25, 2017

(86) PCT No.: PCT/JP2017/046446
§ 371 (c)(1),
(2) Date: Jun. 26, 2019

(87) PCT Pub. No.: WO2018/123980
PCT Pub. Date: Jul. 5, 2018

(65) Prior Publication Data
US 2020/0215619 A1    Jul. 9, 2020

(30) Foreign Application Priority Data
Dec. 26, 2016 (JP) .............................. JP2016-250806

(51) Int. Cl.
*B23B 27/14* (2006.01)

(52) U.S. Cl.
CPC ............ *B23B 27/14* (2013.01); *B23B 27/148* (2013.01)

(58) Field of Classification Search
CPC .... B23B 27/14; B23B 27/148; B23B 2228/10
USPC .................................................. 428/698, 701
See application file for complete search history.

(56) References Cited

U.S. PATENT DOCUMENTS

| | | | | |
|---|---|---|---|---|
| 5,123,934 A * | 6/1992 | Katayama | ............... | C23C 16/56 51/295 |
| 6,187,421 B1 * | 2/2001 | Moriguchi | ............ | C23C 28/044 428/216 |
| 2004/0161639 A1 * | 8/2004 | Fukano | ................. | C23C 30/005 428/698 |
| 2013/0101365 A1 * | 4/2013 | Kanaoka | ............... | C23C 28/044 407/119 |

(Continued)

FOREIGN PATENT DOCUMENTS

| JP | H05116003 A | 5/1993 |
|---|---|---|
| JP | H11197907 A | 7/1999 |

(Continued)

*Primary Examiner* — Archene A Turner
(74) *Attorney, Agent, or Firm* — Viering, Jentschura & Partner mbB

(57) ABSTRACT

A cutting insert may include a base member and a coating layer thereon. The coating layer may include a first layer including a titanium compound on the base member, a second layer including alumina and an upper surface on the first layer, and a third layer including a titanium compound on the upper surface. The coating layer may include a crack at a top surface and therein. In a cross section orthogonal to the top surface, the crack may be present in the third layer and the second layer; in the third layer it may have a width of 1 μm or more. In the upper surface it may have a width of 0.5 μm or more—smaller than the width of the crack in the third layer. Another part may have a width of 0.2 μm or less closer to the base member than the upper surface.

13 Claims, 6 Drawing Sheets

(56) References Cited

U.S. PATENT DOCUMENTS

| | | | |
|---|---|---|---|
| 2013/0136907 A1* | 5/2013 | Chen | B23B 27/148 428/216 |
| 2014/0227052 A1 | 8/2014 | Hirano | |
| 2015/0030401 A1* | 1/2015 | Senbokuya | B23B 51/00 407/119 |
| 2016/0208379 A1 | 7/2016 | Satoh | |

FOREIGN PATENT DOCUMENTS

| | | | |
|---|---|---|---|
| JP | 2005186221 A | | 7/2005 |
| JP | 2010-046757 | * | 3/2010 |
| WO | 2013042790 A1 | | 3/2013 |
| WO | 2015025903 A1 | | 2/2015 |

* cited by examiner

CUTTING INSERT

CROSS-REFERENCE TO RELATED APPLICATIONS

This application is a national stage entry according to 35 U.S.C. 371 of PCT Application No. PCT/JP2017/046446 filed on Dec. 25, 2017, which claims priority to Japanese Application No. 2016-250806 filed on Dec. 26, 2016, which are entirely incorporated herein by reference.

TECHNICAL FIELD

The present disclosure relates to a cutting insert for use in a cutting process.

BACKGROUND

Cutting inserts described in, for example, Patent Documents 1 to 3 (Patent Document 1: Japanese Unexamined Patent Publication No. 5-116003, Patent Document 2: Japanese Unexamined Patent Publication No. 11-197907, Patent Document 3: WO 2015/025903) may be used as a cutting insert for use in a cutting process of a workpiece. The cutting inserts described in these patent documents may include a base member containing WC and the like, and a coating layer disposed on a surface of the base member. A crack may be formed in the coating layer. A plurality of laminate structures which may include a layer containing a titanium compound and a layer containing alumina are described as the coating layer. These patent documents describe that steel balls including a diameter of 300 μm, and alumina and zirconia each including a diameter of 160 μm may be brought into collision with a surface of the coating layer in order to form the crack in the coating layer by dry blasting.

SUMMARY

A cutting insert according to a non-limiting aspect of the present disclosure may include a base member and a coating layer located on the base member. The coating layer may include a first layer, a second layer and a third layer. The first layer may be located on the base member and include a titanium compound. The second layer may be located on the first layer and include alumina and also include an upper surface. The third layer may be located on the upper surface and include a titanium compound. The coating layer may include a crack located at a top surface of the coating layer. The crack may be located in at least the third layer and the second layer. In a cross section orthogonal to the top surface, the crack in the third layer may include a width of 1 μm or more. The crack in the upper surface may include a width of 0.5 μm or more being smaller than the width of the crack in the third layer. The crack may include a part including a width of 0.2 μm or less at a position closer to the base member than the upper surface.

DETAILED DESCRIPTION

Figure 1:
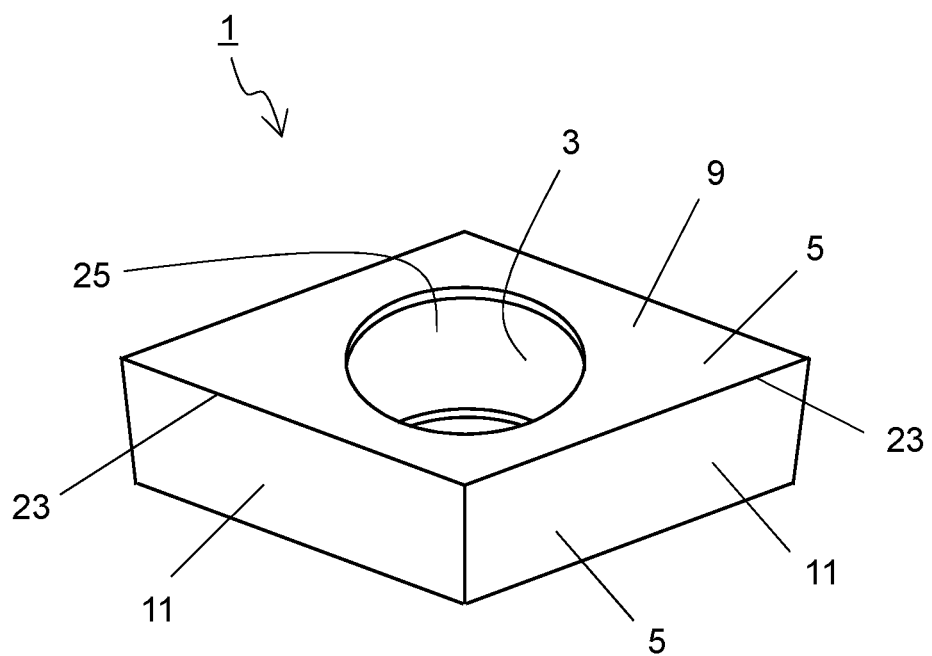
FIG. 1 is a perspective view illustrating a cutting insert in a non-limiting embodiment.

A cutting insert (hereinafter also referred to as "insert") according to a non-limiting aspect of the present disclosure is described in detail below with reference to the drawings. For the sake of description, the drawings referred to in the following illustrate, in a simplified form, only main members necessary for describing the non-limiting embodiments. The cutting insert in the present disclosure is therefore capable of including any arbitrary structural member not illustrated in the drawings referred to. Sizes of the members in each of the drawings do not faithfully represent sizes of actual structural members and dimension ratios of these members.

Figure 2:
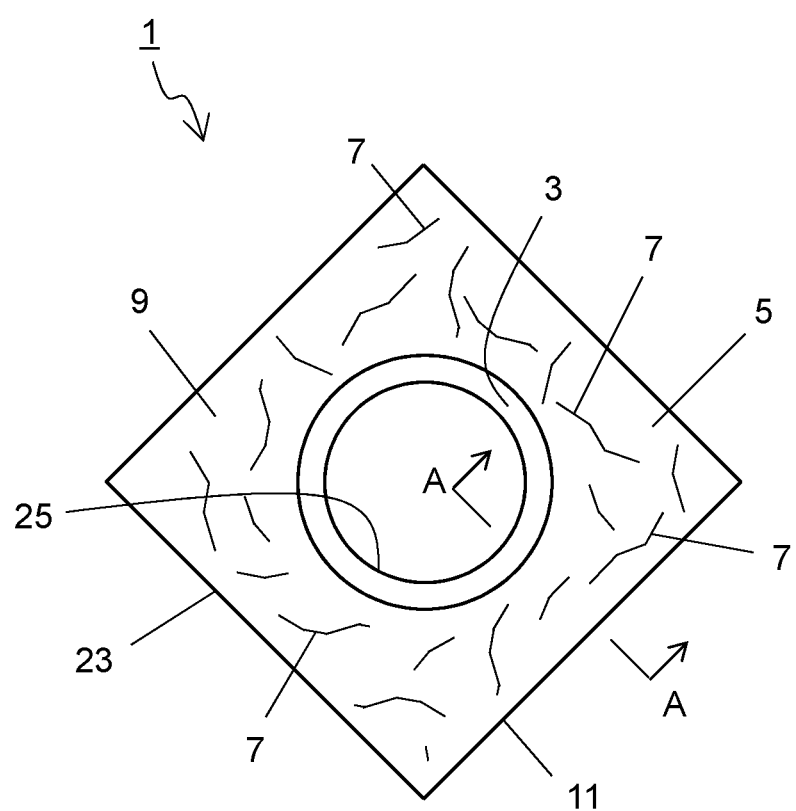
FIG. 2 is a schematic plan view of the cutting insert illustrated in FIG. 1.
Figure 3:
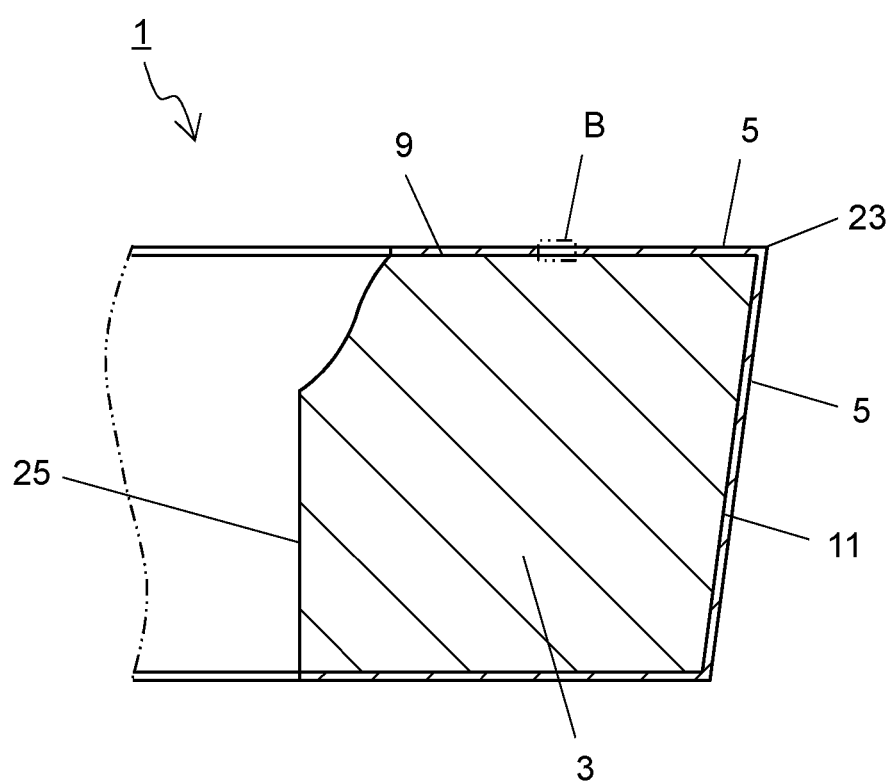
FIG. 3 is a sectional view taken along line A-A in the cutting insert illustrated in FIG. 1.
Figure 4:
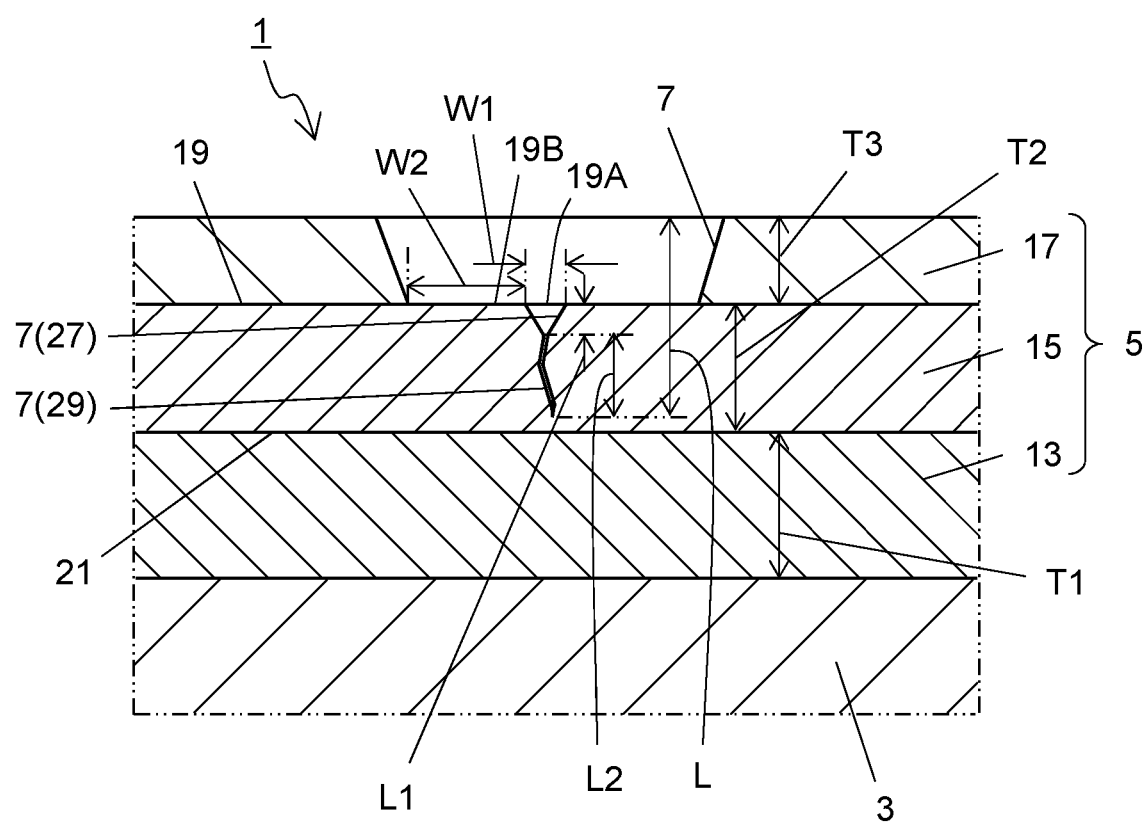
FIG. 4 is an enlarged view of a region B illustrated in FIG. 3.

The insert 1 in non-limiting embodiments includes a base member 3 and a coating layer 5 located on a surface of the base member 3 as illustrated in FIGS. 1 to 3. The coating layer 5 is intended to improve wear resistance of the insert 1. The insert 1 in the non-limiting embodiments includes a crack 7 located at a top surface as illustrated in FIG. 4.

The base member 3 includes a first surface 9. In the base member 3 in the non-limiting embodiments, a surface which has a polygonal plate shape and is located above corresponds to the first surface 9 as illustrated in FIG. 1. The base member 3 also includes a second surface 11 adjacent to the first surface 9. A side surface in FIG. 1 corresponds to the second surface 11. The coating layer 5 is located on the base member 3. The coating layer 5 is located on the first surface 9 and the second surface 11 in the base member 3. The coating layer 5 covers these surfaces in the non-limiting embodiments.

Although there is no particular limitation on the size of the base member 3, the first surface 9 has a square shape in the base member 3 in the non-limiting embodiments as illustrated in FIG. 2. A length of one side of an upper surface of the base member 3 is settable to approximately 3-20 mm. A height from the upper surface (first surface 9) to a lower surface is settable to approximately 5-20 mm.

The coating layer 5 in the non-limiting embodiments includes a first layer, a second layer 15 and a third layer 17. As illustrated in FIG. 4, the first layer 13 is located on the base member 3 and includes a titanium compound. The second layer 15 is located on the first layer 13 and includes alumina. The third layer 17 is located on the second layer 15 and includes a titanium compound. The second layer 15 includes an upper surface 19 located on a side of a surface of the second layer 15, and a lower surface 21 located on a side of the base member 3. The upper surface 19 of the second layer 15 is in contact with the third layer 17, and the lower surface 21 of the second layer 15 is in contact with the first layer 13 in the non-limiting embodiments. Alternatively, the third layer 17 may be a laminated structure of a plurality of layers including titanium compounds different in composition. In that case, the plurality of layers including the titanium compounds are collectively referred to as the third layer 17. The first layer 13 may also be a laminated structure of a plurality of layers including titanium compounds different in composition. In that case, the plurality of layers are collectively referred to as the first layer 13.

A thickness T1 of the first layer 13 is settable to, for example, 6-13 μm. A thickness T2 of the second layer 15 is settable to, for example, 1-15 μm. A thickness T3 of the third layer 17 is settable to, for example, 0.1-3 μm. The thicknesses of the first layer 13 to the third layer 17 are for illustration purposes only and are not intended to limit these numeric value ranges.

As already described earlier, the insert 1 in the non-limiting embodiments includes the crack 7 at top surface of the coating layer 5 and inside thereof. In other words, the crack 7 is located in at least the third layer and the second layer in the coating layer 5. Because the insert 1 includes the crack 7 extending from the surface of the coating layer 5 toward at least the second layer 15, part of stress remaining in the third layer 17 can be released at least in the vicinity of at least the crack 7. This contributes to enhancing facture resistance of the insert The crack 7 includes the following characteristic feature. In a cross section orthogonal to the top surface of the coating layer 5, the third layer 17 includes a crack width of 1 μm or more. The upper surface 19 of the second layer 15 is narrower than the crack width of the third layer 17 and includes a crack width of 0.5 μm or more. The crack 7 includes a part including a width of 0.2 μm or less (a crack 7 (29) in FIG. 4) at a position closer to the base member 3 than the upper surface 19 of the second layer 15.

The cross section orthogonal to the top surface of the coating layer 5 denotes a cross section which is orthogonal to the top surface of the coating layer 5 and which is also orthogonal to a longitudinal direction being longest in the crack 7 observable when the coating layer 5 is viewed from above.

The phrase that "the width of the crack 7 in the third layer 17 is 1 μm or more" does not mean to exclude one in which the width of the crack 7 in the third layer 17 is partially less than 1 μm. The phrase that "the width of the crack 7 in the third layer 17 is 1 μm or more" means that an average value of the widths of the crack 7 in the third layer 17 in the cross section is 1 or more. The average value may be calculated, for example, by setting three locations of upper, middle and lower portions of the third layer 17 as a measuring portion in the cross section as illustrated in FIG. 4.

With the insert 1 including the above configuration in the present disclosure, stress around the crack 7 being present in the third layer 17 and the upper surface 19 of the second layer 15 can be released and residual stress applied to a boundary between the second layer 15 and the third layer 17 can be reduced. The third layer 17 is therefore less likely to separate from the second layer 15.

The presence or absence of the crack 7 is easily observable by viewing the insert 1 from above. A depth of the crack 7, namely, a length L in a direction orthogonal to the first surface 9 is measurable by observing an electron micrograph (scanning electron microscope (SEM) photograph or transmission electron microscope (TEM) photograph in the cross section orthogonal to the longitudinal direction of the crack 7 and orthogonal to the top surface of the coating layer 5.

It is easy to evaluate the state of the crack 7 by observing the cross section orthogonal to the longitudinal direction of the crack 7 and orthogonal to the top surface of the coating layer 5 when the insert 1 is viewed from above. FIGS. 3 and 4 illustrate a cross section orthogonal to a propagation direction of the crack 7 and orthogonal to the top surface of the coating layer 5.

The first surface 9 of the base member 3 in the non-limiting embodiments has a square shape, but there is no intention to limit thereto. As is apparent from the above description that the shape of the base member 3 is, for example, the polygonal plate shape, the first surface 9 may have, for example, a triangular, pentagonal or hexagon shape. Alternatively, the upper surface may have a circular shape.

In cases where the base member 3 has the polygonal plate shape as described above, the insert 1 also has a polygonal plate shape. A cutting edge 23 is located on at least a part of an intersecting part of a surface in the insert 1 having the polygonal plate shape which corresponds to the first surface 9 and a surface in the insert 1 which corresponds to the second surface 11. In this case, one of the surface corresponding to the first surface 9 and the surface corresponding to the second surface 11 functions as a rake surface, and the other functions as a flank surface.

The base member 3 includes a through hole 25 that opens into the first surface 9 in the present non-limiting embodiments. The through hole 25 is usable, for example, for screwing the insert 1 into a holder of a cutting tool. Therefore, the coating layer 5 may or may not be present on a surface of the through hole 25.

For example, cemented carbide, cermet, or ceramics are usable as a material of the base member 3. Examples of compositions of the cemented carbide include WC—Co, WC—TiC—Co, and WC—TiC—TaC—Co. The WC—Co is produced by adding cobalt (Co) powder to tungsten carbide (WC), followed by sintering. The WC—TiC—Co is produced by adding titanium carbide (TiC) to WC—Co. The WC—TiC—TaC—Co is produced by adding tantalum carbide (TaC) to WC—TiC—Co.

The cermet is a sintered composite material obtainable by compositing metal into a ceramic ingredient. A specific example of the cermet is one which is composed mainly of a titanium compound, such as titanium carbide (TiC) and titanium nitride (TiN).

Examples of compositions of the ceramics include silicon nitride ($Si_3N_4$), aluminum oxide ($Al_2O_3$), diamond, and cubic boron nitride (cBN).

Examples of material of the first layer 13 including the titanium compound include titanium nitride (TiN), titanium carbonitride (TiCN), and oxidized titanium carbonitride (TiCNO). The first layer 13 includes these materials as a main component. The first layer 13 may include only one of these materials, or may be composed of a plurality of kinds selected from these materials. The first layer 13 is used for enhancing bondability between the base member 3 and the second layer 15 in some cases. In this case, the first layer 13 is also referred to as an underlayer.

The first layer 13 may be composed only of one layer, or may be a laminated structure of a plurality of layers. In cases where the first layer 13 is the laminated structure of a plurality of layers, each of the layers includes a titanium compound.

The second layer 15 includes alumina as a main component. There is no particular limitation on structure of the alumina. For example, either one of alumina including κ-type crystal structure and alumina including α-type crystal structure is usable. Similarly to the first layer 13, the second layer 15 may be composed only of one layer, or may be a laminated structure of a plurality of layers. For example, the second layer 15 may be a laminated structure of a layer including the alumina including κ-type crystal structure and a layer including the alumina including α-type crystal structure.

Examples of material of the third layer 17 including the titanium compound include the materials exemplified above as the material of the first layer 13. In cases where the third layer 17 is located outermost of the coating layer 5, the third layer 17 may include titanium carbonitride (TiCN) as a main component in a non-limiting aspect of the disclosure in order to ensure a smooth chip flow during a cutting process.

The term "main component" in the above denotes one whose mass % is largest among materials constituting a target layer. For example, the phrase that "the third layer 17 includes titanium carbonitride (TiCN) as a main component" denotes that the titanium carbonitride (TiCN) includes the largest mass % among those of the materials constituting the third layer 17.

The materials of the first layer 13 to the third layer 17 are not limited to the materials described above. For example, the first layer 13 and the third layer 17 may include alumina. In this case, a content ratio of alumina in each of the first layer 13 and the third layer 17 may be smaller than a content ratio of alumina in the second layer 15. The bondability between the second layer 15 and both the first layer 13 and the third layer 17 can be enhanced when the first layer 13 and the third layer 17 include the alumina.

Alternatively, the second layer 15 may include a titanium compound. In this case, a content ratio of the titanium compound in the second layer 15 may be smaller than the content ratio of the titanium compound in each of the first layer 13 and the third layer 17. The bondability between the second layer 15 and both the first layer 13 and the third layer 17 can also be enhanced when the second layer 15 includes the titanium compound.

The crack 7 extends from the top surface of the coating layer 5 toward the second layer 15 as described above. Wear resistance can be enhanced while reducing the probability that the third layer 17 separates from the second layer 15 in cases where a part of the crack 7 which is located in the second layer 15 includes a first region 27 and a second region 29. The first region 27 is located on a side of the upper surface 19, and a width of the first region 27 becomes smaller as going away from the upper surface 19. The second region 29 is located closer to a side of the first layer 13 than the first region 27, and a width of the second region 29 is held constant.

This is due to the following two reasons. The first reason is that the third layer 17 is less likely to separate from the second layer 15 because residual stress applied to a boundary between the second layer 15 and the third layer 17 can be reduced than when the part of the crack 7 which is located in the second layer 15 is composed only of the second region 29. The second reason is that fracture resistance of the second layer 15 is less likely to deteriorate because the width of the crack 7 on the side of the upper surface 19 can be made smaller than when the part of the crack 7 which is located in the second layer 15 is composed only of the first region 27, and because it becomes difficult for chips to deeply enter the crack 7 during a cutting process.

In the above case, the third layer 17 is much less likely to separate from the second layer 15 and the wear resistance of the second layer 15 is much less likely to deteriorate when a length L2 of the second region 29 in a direction orthogonal to the first surface 9 is larger than a length L1 of the first region 27 in a direction orthogonal to the first surface 9 in the cross section orthogonal to the surface of the coating layer 5.

The phrase that "the width of the crack 7 is held constant in the second region 29" does not mean that the width thereof needs to be strictly held constant. It is intended to indicate that the crack 7 extends in a line shape in the cross section orthogonal to the surface of the coating layer 5. That is, there may be variation of approximately 5% relative to the length L of the crack 7 indicated in the direction orthogonal to the first surface 9 in the cross section orthogonal to the top surface of the coating layer 5. The width of the crack 7 in the second region 29 is 0.2 μm or less.

Figure 5:
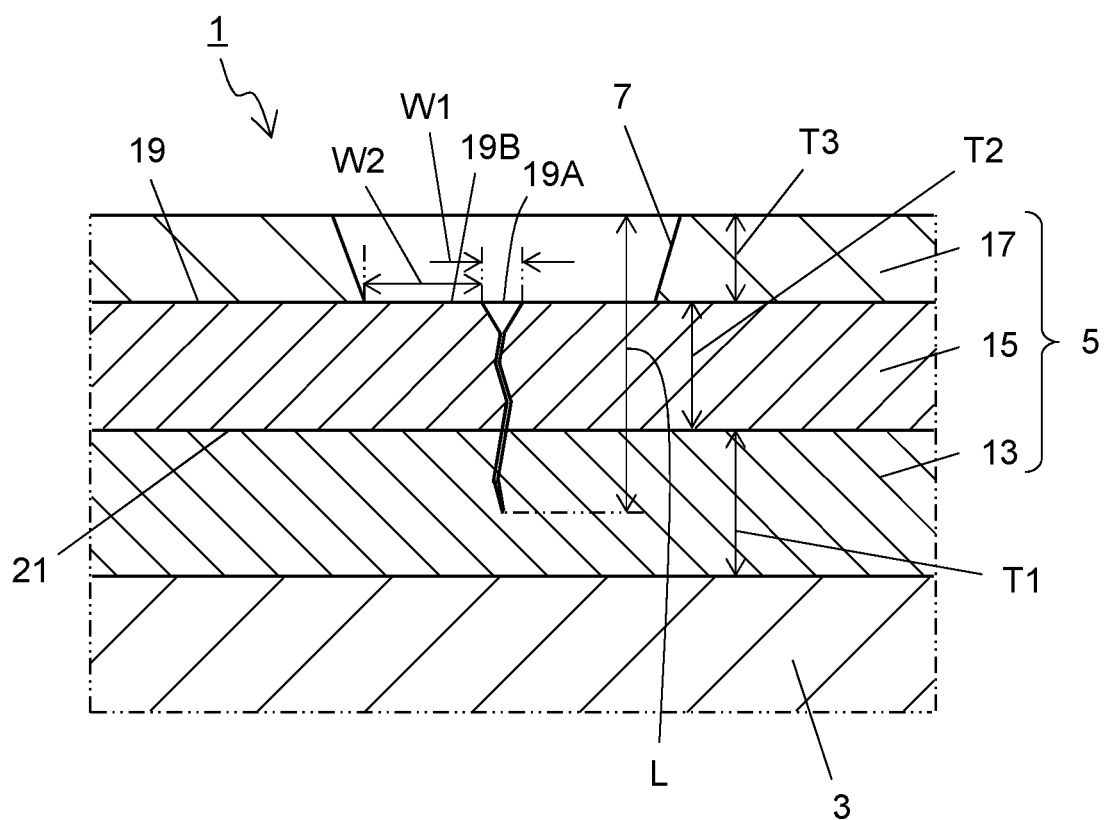
FIG. 5 is an enlarged view of a first non-limiting modification of the cutting insert illustrated in FIG. 4.

A front end of the crack 7 may be located in the second layer 15 in the cross section orthogonal to the surface of the coating layer 5 because the crack 7 extends from the surface of the coating layer 5 into the second layer 15. Alternatively, the front end of the crack 7 may be located in the first layer 13 and the crack 7 may extend into the first layer 13 as illustrated in FIG. 5. In cases where the crack 7 extends from the surface of the coating layer 5 into the first layer 13, the residual stress applied to the boundary between the first layer 13 and the second layer 15 can be reduced, and the second layer 15 is therefore less likely to separate from the first layer 13.

In cases where the width of the crack 7 in the first layer 13 is held constant and identical with the width of the crack 7 in the second region 29 in the cross section orthogonal to the surface of the coating layer 5, the width of the crack 7 in the first layer 13 and in the second layer 15 becomes smaller, and the fracture resistance of the first layer 13 and the second layer 15 is less likely to deteriorate.

The phrase that "the width of the crack 7 is held constant in the first layer 13" does not mean that the width thereof needs to be strictly held constant. There may be variation of approximately 5% relative to the length L of the crack 7 indicated in the direction orthogonal to the first surface 9 in the cross section orthogonal to the surface of the coating layer 5.

Figure 6:
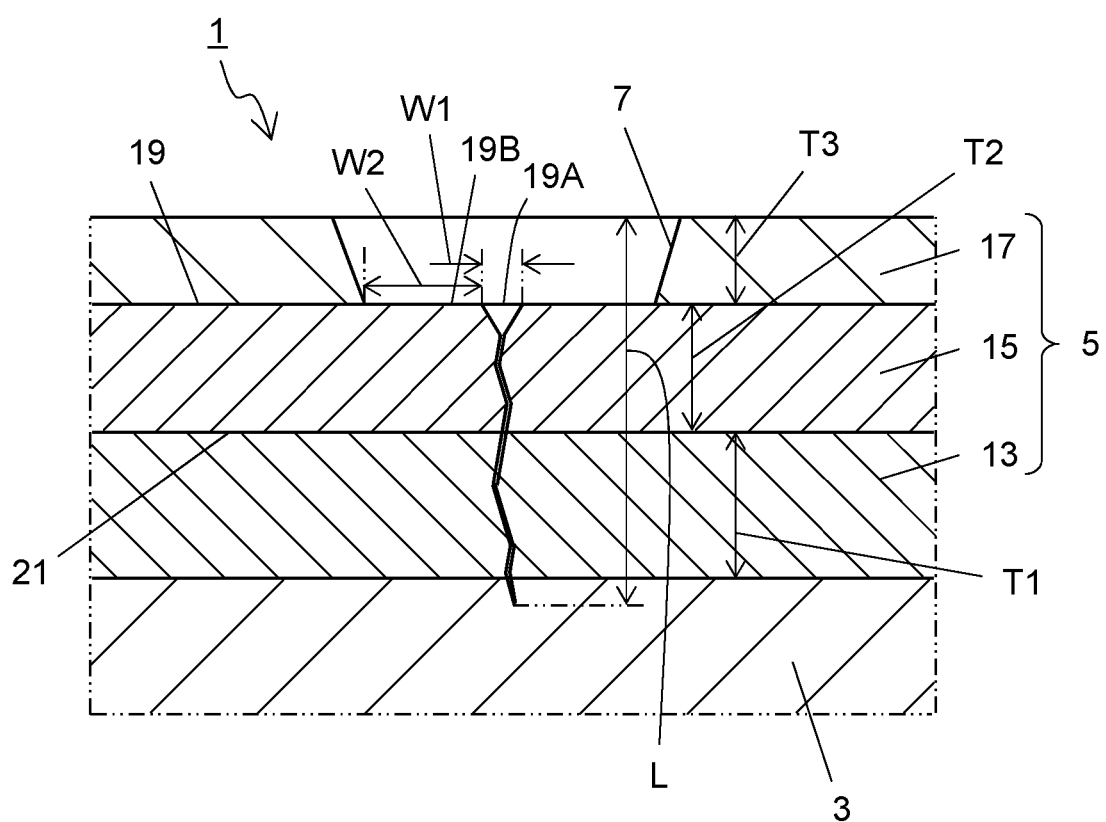
FIG. 6 is an enlarged view of a second non-limiting modification of the cutting insert illustrated in FIG. 4.

The front end of the crack 7 may be further located in the base member 3 as illustrated in FIG. 6. That is, the crack 7 may extend from the surface of the coating layer 5 into the base member 3. In cases where the crack 7 extends into the base member 3, the residual stress applied to the boundary between the base member 3 and the first layer 13 can be reduced, and the first layer 13 is therefore less likely to separate from the base member 3.

The following description is made on the assumption that part of the crack 7 in the upper surface 19 of the second layer 15 is referred to as a separation part 19A, and a part where the third layer 17 is not located on the second layer 15 due to a difference between a crack width of the third layer 17 and a crack width of the upper surface 19 of the second layer 15 is referred to as an exposed part 19B in the cross section as illustrated in FIG. 4.

In cases where the upper surface 19 includes the exposed part 19B not covered with the third layer 17 and a width W2 of the exposed part 19B is wider than a width W1 of the separation part 19A in the second layer 15 in the cross section orthogonal to the surface of the coating layer 5 as illustrated in FIG. 4, there is a large region in the upper surface 19 which is exposed to release residual stress. Therefore, the residual stress applied to the boundary between the second layer 15 and the third layer 17 can be reduced. In the meanwhile, the width W1 of the separation part 19A in the upper surface 19 is relatively smaller than the width W2 of the exposed part 19B, and the fracture resistance of the second layer 15 is therefore less likely to deteriorate.

In cases where the width W2 of the exposed part 19B of the upper surface 19 is larger than a thickness T3 of the third layer 17 in the cross section orthogonal to the surface of the coating layer 5, the third layer 17 is much less likely to separate from the second layer 15. The reason for this is as follows. Even though the residual stress applied to the boundary between the second layer 15 and the third layer 17 increases with increasing the thickness T3 of the third layer 17, the residual stress applied to the boundary between the second layer 15 and the third layer 17 can be further reduced because of the large region of the exposed part 19B in the upper surface 19 which is exposed to release the stress.

The cutting insert in the present disclosure is may be manufactured, for example, through the following steps.

An insert is first prepared which includes, on a base member, a coating layer including a first layer, a second layer and a third layer.

Subsequently, a liquid obtained by mixing together water and ceramic particles whose mean particle diameter is 50 μm or less is sprayed from a side of the surface of the coating layer by so-called wet blasting. Spray velocity may be suitably adjusted in a range of 10-100 m/sec while observing a crack state in the insert. Alumina and zirconia are suitably usable as the ceramic particles. Because these ceramic particles have a lower specific gravity than steel balls, energy occurred when the ceramic particles collide with the coating layer becomes smaller. Alternatively, the energy occurred when the ceramic particles collide with the coating layer becomes smaller by using ceramic particles including a diameter of 50 μm or less.

For example, the specific gravity when alumina is used as ceramic particles becomes a half or less of a specific gravity when steel balls are used. When a particle diameter is reduced to ¼, volume is reduced to ¹⁄₆₄ and weight is also reduced to ¹⁄₆₄. That is, when alumina particles whose particle diameter is ¼ are used instead of steel balls including a certain size, weight of the alumina particles per particle is reduced to ¹⁄₁₀₀ or less of that of the steel balls.

Thus, collision energy per ceramic particle becomes lower by using the ceramic particles including a relatively small particle diameter instead of the steel balls. From the viewpoint of hardness, the ceramic particles have higher hardness than the steel balls.

By using the ceramic particles including a relatively small particle diameter, collision including relatively low energy and relatively high polishing force occurs repeatedly on the surface of the coating layer. A small crack occurs first on the surface of the coating layer, and the crack gradually becomes deeper as time progressed. A peripheral region of the crack gradually becomes fractured and the width of the crack becomes wider on a side of the surface of the coating layer.

The insert is manufacturable through the above steps. The width of the crack in the third layer is 1 μm or more, the width of the crack in the upper surface of the second layer is 0.5 μm or more, and the second layer includes a part where the width of the crack is 0.2 μm or less in a cross section orthogonal to the surface of the coating layer.

The mean particle diameter of ceramic particles used may be set to 40 μm or less in one non-limiting aspect or 30 μm or less in another non-limiting aspect of the present disclosure.

In contrast, impact is large with the use of steel balls or ceramic particles whose diameter exceeds 50 μm. Therefore, a crack occurs and the entire surface of the coating layer is approximately uniformly cut out at the same time, resulting in the crack including a different structure from the insert in the present disclosure.

Alternatively, the above blasting process may be applied to an insert which is previously provided with a crack whose width is 0.2 μm or less during layer formation or by heat treatment.

The present disclosure is not limited to the above non-limiting embodiments, and various changes, improvement and combinations can be made without departing from the gist of the present disclosure.

DESCRIPTION OF THE REFERENCE NUMERALS 1 cutting insert (insert)
3 base member
5 coating layer
7 crack
9 first surface
11 second surface
13 first layer
15 second layer
19 third layer
19 upper surface
19A separation part
19B exposed part
21 lower surface
23 cutting edge
25 through hole
27 first region
29 second region

What is claimed is:
1. A cutting insert, comprising:
a base member and a coating layer located on the base member,
wherein
the coating layer comprises:
a first layer located on the base member and comprising a titanium compound,
a second layer located on the first layer and comprising alumina and an upper surface, and
a third layer located on the upper surface and comprising a titanium compound;
the coating layer comprises a crack located at an outermost surface thereof and extending inwards;
the crack is located in at least the third layer and the second layer; and
in a cross section orthogonal to the surface of the coating layer, the crack in the third layer has a width of 1 μm or more, the crack in the upper surface has a width of 0.5 μm or more and is smaller than the width of the crack in the third layer, and the crack comprises a part having a width of 0.2 μm or less at a position closer to the base member than the upper surface.
2. The cutting insert according to claim 1, wherein, in the cross section, a part of the crack located in the second layer comprises a first region and a second region, the first region located at a side closer to the upper surface than the second region and has a smaller width going away from the upper surface, and the second region is of constant width and located closer to a side of the first layer than the first region.
3. The cutting insert according to claim 2, wherein a length in a direction orthogonal to the surface of the coating layer in the second region is larger than the length in the first region in the cross section.
4. The cutting insert according to claim 2, wherein the crack is located in the first layer, and
a width of the crack in the first layer is held constant and identical with a width of the crack in the second region in the cross section.
5. The cutting insert according to claim 2, wherein the crack is further located in the base member.

6. The cutting insert according to claim 2, wherein
the upper surface comprises an exposed part not covered with the third layer and a width of the exposed part is larger than a width of the crack in the upper surface in the cross section.

7. The cutting insert according to claim 6, wherein
the width of the exposed part is larger than a thickness of the third layer.

8. The cutting insert according to claim 4, wherein
the crack is further located in the base member.

9. The cutting insert according to claim 4, wherein
the upper surface comprises an exposed part not covered with the third layer and a width of the exposed part is larger than a width of the crack in the upper surface of the second layer in the cross section.

10. The cutting insert according to claim 5, wherein
the upper surface comprises an exposed part not covered with the third layer and a width of the exposed part is larger than a width of the crack in the upper surface of the second layer in the cross section.

11. The cutting insert according to claim 3, wherein
the crack is located in the first layer, and
a width of the crack in the first layer is held constant and identical with a width of the crack in the second region in the cross section.

12. The cutting insert according to claim 3, wherein
the crack extends from the surface of the coating layer into the base member.

13. The cutting insert according to claim 3, wherein
the upper surface comprises an exposed part not covered with the third layer and a width of the exposed part is larger than a width of the crack in the upper surface of the second layer in the cross section.

* * * * *